June 24, 1930.  J. T. TRUMBLE  1,768,347
TIE ROD CONSTRUCTION
Filed Feb. 2, 1925

INVENTOR
John T. Trumble
BY
Blackmore, Spencer & Flint
ATTORNEY

Patented June 24, 1930

1,768,347

UNITED STATES PATENT OFFICE

JOHN T. TRUMBLE, OF LANSING, MICHIGAN, ASSIGNOR TO GENERAL MOTORS CORPORATION, OF DETROIT, MICHIGAN, A CORPORATION OF DELAWARE

TIE-ROD CONSTRUCTION

Application filed February 2, 1925. Serial No. 6,323.

The present invention relates to hinge joint construction and particularly to ball and socket joint construction for tie rods and the like forming part of the steering mechanism of automobiles.

In the ordinary construction of steering mechanism for automobiles and the like it is customary to provide arms on the spindles of the dirigible wheels and to fix the relation of such wheels to each other by means of a rod secured in hinged relation to such arms. This rod is usually adjustable by means of a turnbuckle or sleeve in order to secure and fix the relation of the wheels to each other, but such adjustment is inconvenient and more or less difficult.

The present invention has for its object to overcome the difficulties incident to the usual construction and provide a simple, cheap, and efficient means of adjustment which will not easily get out of order and will provide sufficient adjustment and strength to maintain the wheel relation.

In the drawings

Figure 1:
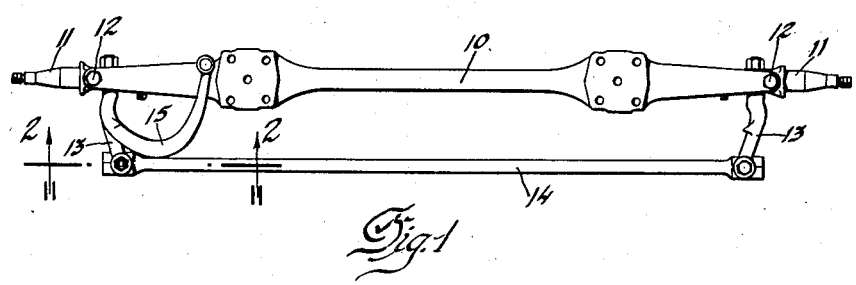
Figure 1 illustrates in plan a front axle of an automobile showing an application of the invention.

As illustrated the front axle 10 of an automobile is provided with wheel spindles 11 arranged to swing in a horizontal plane about pins 12. The spindles 11 are provided with arms 13 secured rigidly thereto and these arms 13 are secured in proper relation to each other by means of a cross tie-rod 14. Through another arm 15 secured to one of the spindles direction of both wheels may be accomplished through the usual steering gear and wheel.

Figure 2:
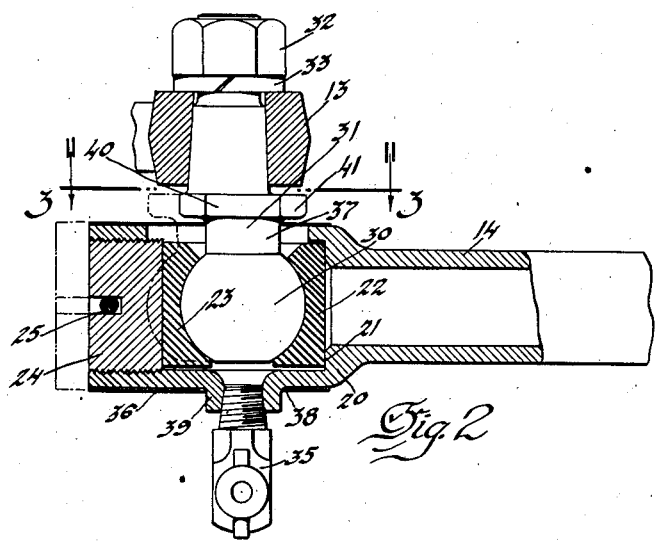
Figure 2 is a vertical section on line 2—2 of Figure 1.
Figure 3:
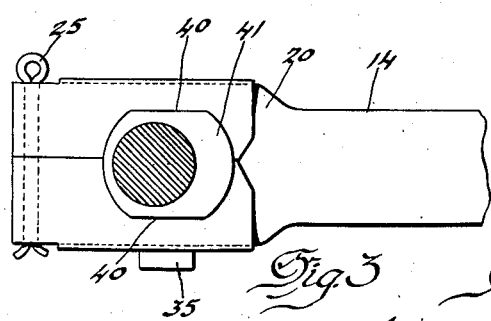
Figure 3 is a horizontal section on line 3—3 of Figure 2.

In the present construction, the joint between rod 14 and one or both arms 13 is to be made as shown in Figures 2 and 3. In these figures, the rod 14 is provided, as shown, with an enlarged end 20 which forms an internal shoulder 21 upon which is seated a socket bearing member 22 forming a part of the socket bearing. The rest of the socket bearing is formed by another similar member 23 inserted in the end of enlargement 20 and held therein by means of a screw plug 24. The screw plug 24 is in turn maintained in place by a cotter pin 25 extending through holes in the enlargement 20 and a slot in plug 24.

Cooperating with the socket bearing described is a ball 30 integral with a stud 31 which stud is fixed in arm 13, the stud being tapered and held in the correspondingly tapered hole in arm 13 by means of a nut 32 and lock washer 33.

A grease nipple 35 for lubrication and a shield 36 for excluding dirt from the joint are also provided. The dust shield in this construction will be formed to fit snugly about the neck 38 of the stud and will be provided with a hole through which will protrude the boss 39 into which the nipple 35 is screwed.

As indicated in the drawings the axes of the ball 30 and the tapered portion of the stud which lies within the tapered hole in the arm 13 are non-coincident. Further, the stud is rotatably mounted in its tapered bearing in arm 13 and may be fixed in any angular position by means of nut 32. Such construction permits of the shifting of the ball sidewise, referring to Figure 2, and the changing of the relation between arm 13 and rod 14 by merely rotating the stud in its mounting in arm 13. This rotation can easily be done when nut 32 is loosened as flat portions 40 may be provided upon a shoulder 41 upon the stud intermediate the ball 30 and the taper.

Figure 2 indicates in dotted lines a second position of the joint with relation to a fixed position of arm 13.

I claim:

The combination in a vehicle steering gear, of stub axles, arms projecting from the stub axles, a rod connecting said arms, and means for adjusting the relation between said arms, comprising; a stud having a shank rotatably mounted in one of said arms, means for retaining said stud fixedly in selected position, and a ball on the stud cooperating with a socket in the connecting rod, said ball being eccentric to the axis of the stud.

In testimony whereof I affix my signature.

JOHN T. TRUMBLE.